3,164,477
PROCESS FOR PREPARING SOFT CHEESES
WITH SUCRESTERS
Luciano Nobile, Milan, Italy, assignor to
Ledoga, S.p.A., Milan, Italy
No Drawing. Filed May 3, 1962, Ser. No. 192,078
2 Claims. (Cl. 99—116)

The present invention relates to the manufacture of alimentary compositions, and more particularly to the manufacture of cheeses and to the products so obtained.

It is the general object of the invention to provide a process for the manufacture of cheeses and especially of soft cheeses, whereby their keeping qualities and particularly form stability are improved.

It is also an object of the invention to modify the composition of soft cheeses in such manner that their flavor improves with time. Other objects and advantages of the invention will become apparent from the following detailed description thereof.

I have found that by incorporating a small proportion of one or more sucrose esters of one or more edible aliphatic acids of 6 to 30 carbon atoms, both saturated and unsaturated, in the milk prior to formation of the soft cheese, a product is ultimately obtained which is more stable and in general has better keeping qualities than the corresponding cheeses prepared by known procedures.

The sucrose esters or esters can be the individual esters or mixture of esters (sucresters) prepared, for example, by transesterification of sucrose and a lower aliphatic alcohol ester of an edible aliphatic acid or acids of 6 to 30 carbon atoms, or they may be contained in the complex mixtures obtained by the transesterification of sucrose with a natural triglyceride (glycerol triester), such products being known as "sucroglyceride."

Processes for the preparation both of sucresters and of sucroglycerides are known. Thus sucroglycerides are obtained by transesterification, in solvent phase, of natural triglycerides such as lard oil, tallow, cocoanut oil, palm oil, palmiste oil, etc., or of edible synthetic triglycerides, with sucrose in the presence of an alkaline catalyst.

During the reaction, one or more acid residues of the glyceride or glycerides are removed and go to fix one or more alcoholic hydroxyls of the sucrose, which thus becomes esterified. Under these conditions, a series of products is obtained, with different contents of combined sugar, depending on the quantity of sucrose present in the transesterification reaction. These sucroglycerides are composed in different proportions of the following: monoesters of sucrose with the different fatty acids contained in the starting glycerides; mono- and diglycerides, or their mixtures, according to the quantity of aliphatic acid removed from each mole of the starting triglyceride or triglycerides; and non-reacted triglycerides, generally in small proportions. When, under similar conditions, pure or mixed methylic and ethylic esters of aliphatic acids are subjected to transesterification with sucrose, esters of sucrose, i.e., its mono- and diesters (sucresters), are obtained in proportions depending on the quantity of sucrose present during the reaction.

It is known that both sucroglycerides and sucresters have good dispersing and emulsifying properties. Nevertheless, I have found that upon the addition of sucresters and sucroglycerides to the milk during the preparation of soft cheeses, a higher precipitation of substances contained in the milk is obtained, and the cheeses ultimately obtained in the usual processes of cheese-manufacture have distinctly improved properties over those of the heretofore produced cheeses.

For practical purposes, an aqueous solution or suspension of 0.1% to 5% of the selected sucrester or sucroglyceride is prepared and added to the milk without, however, modifying the usual process for soft cheese production, such an amount of the solution or suspension (or solution-suspension) is employed that the content of the sucresters or sucroglycerides corresponds to about 0.05% to 1% of the milk.

The sucresters and sucroglycerides employed in the present invention are of the type described in the patent to Hass No. 2,893,990, dated July 7, 1959, namely, the edible saturated and unsaturated monobasic fatty acid esters of sucrose (sucresters), with or without the partial glyceridic esters or such acids, and are preferably prepared in dimethylformamide (DMF) as the solvent. However, the products obtained by the processes described in the said patent contain too high a content of DMF for use in foods. There are accordingly employed in the present invention sucresters and sucroglycerides which, when prepared with the aid of DMF, contain less than 100 p.p.m. of such solvent, as described in the copending application of Vitangelo d'Amato, Serial No. 799,100, filed March 13, 1959. As described in such application, the content of DMF in the sucrester or sucroglyceride reaction product obtained by interesterification is reduced to satisfactorily low values by approximately neutralising the basic catalyst of the reaction, followed by extraction of the reaction mixture with an organic solvent for unreacted aliphatic acid ester and free aliphatic acid, the solvent not being miscible with DMF (an example of such solvent being petroleum ether), after which the residual reaction mixture is evaporated to dryness, dissolved in an about 1:1 mixture of cyclohexane and butanol, washed with water which removes unreacted sucrose, and after further washing with a sodium chloride solution, the organic solution is then evaporated to dryness to yield the separated and purified sucrose ester product.

All soft cheeses may be prepared by the process described herewith, i.e., by incorporating sucresters and/or sucroglycerides to milk during their preparation. Entirely satisfactory products were obtained in preparing such cheeses as Camembert, Brie, bel paese, common farmer's cheese, mozzarella and others.

The process can be described in summary as follows.

(1) *Coagulation of milk.*—This operation is generally performed with heating. The temperature to which the milk is heated usually depends on the quality of the cheese to be produced, the conditions of milk (acidity and fat content), the coagulation power of the rennet and on the time it should take to coagulate. As a rule the temperature is 28–30° C. for soft cheeses and 35–40° C. for hard cheeses. When the correct temperature has been reached, the necessary quantity of rennet is added to form a homogeneous mixture (the rennet is diluted wtih water and milk serum); and mass is thoroughly mixed and left to stand, heating is stopped and the pan covered with a lid in order to avoid surface dispersion of the heat.

(2) *Processing of the curd.*—The serum tends to gradually separate during the coagulation from the curd and to collect in a surface layer. However, as the mass gradually increases in consistency, separation becomes increasingly difficult and a certain quantity of serum remains in the coagulated mass. Because of its lactose, lactic acid and enzyme content, besides the presence of other substances, the serum easily alters in composition and this is the reason for its elimination, although the latter must not be complete, as small amounts of serum serve to start the fermentation of the caseinous mass, a phenomenon which is also known as ageing of the cheese.

If the removal occurs too quickly, the sperum entrains a given and by no means negligible quantity of casein, and the normal yield of cheese is therefore lessened.

By contrast, if the coagulum is left standing too long, the contraction causes it to become too thick and makes removal of the serum more difficult, as well as the successive reduction of the curd.

If all of the serum is eliminated immediately, the remaining caseinous mass is too dry and forming, as well as ageing, does not always take place regularly.

The addition of 0.5–1% of sugar esters and sugar glycerides of the milk has demonstrated, in practice, that:

(*a*) The curd forms much more regularly;

(*b*) The formed curd shows a clear breakage without foam and the serum is generally clear without any lumps of curd remaining attached;

(*c*) The yield in weight of the cheese is greater than that obtained from traditional processes.

I claim:

1. Process for preparing soft cheeses of improved stability and of high nutritive value, which comprises adding to the milk, during cheese preparation, a product obtained by transesterification of sucrose with a member of the group consisting of edible natural triglycerides and lower alkyl esters of edible aliphatic acids containing from 6 to 30 carbon atoms, said product being substantially free from unreacted sucrose.

2. Process according to claim 1, wherein the said product is added to the milk in the proportion of 0.05% to 1%, based on the weight of the milk.

References Cited in the file of this patent
UNITED STATES PATENTS

| | | |
|---|---|---|
| 2,160,159 | Goshen et al. | May 30, 1939 |
| 2,485,637 | Gooding et al. | Oct. 25, 1949 |
| 2,963,370 | Roundy | Dec. 6, 1960 |